(12) United States Patent
Krøll Jensen et al.

(10) Patent No.: US 11,286,159 B2
(45) Date of Patent: Mar. 29, 2022

(54) METHOD AND CATALYSTS FOR THE PRODUCTION OF AMMONIA SYNTHESIS GAS

(71) Applicant: HALDOR TOPSØE A/S, Kgs. Lyngby (DK)

(72) Inventors: Annette E. Krøll Jensen, Fredensborg (DK); Christian Henrik Speth, Lynge (DK); Thomas Rostrup-Nielsen, Holte (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 2 days.

(21) Appl. No.: 16/620,150

(22) PCT Filed: Jun. 28, 2018

(86) PCT No.: PCT/EP2018/067389
§ 371 (c)(1),
(2) Date: Dec. 6, 2019

(87) PCT Pub. No.: WO2019/011659
PCT Pub. Date: Jan. 17, 2019

(65) Prior Publication Data
US 2020/0180952 A1    Jun. 11, 2020

(30) Foreign Application Priority Data
Jul. 13, 2017 (DK) .......................... PA 2017 00412

(51) Int. Cl.
| | | |
|---|---|---|
| *C01B 3/02* | (2006.01) | |
| *C01B 32/50* | (2017.01) | |
| *C01B 32/40* | (2017.01) | |
| *B01J 23/00* | (2006.01) | |
| *B01J 23/80* | (2006.01) | |
| *C01B 3/48* | (2006.01) | |
| *B01J 23/72* | (2006.01) | |

(52) U.S. Cl.
CPC ............. *C01B 3/025* (2013.01); *B01J 23/005* (2013.01); *B01J 23/80* (2013.01); *C01B 3/48* (2013.01); *C01B 32/40* (2017.08); *C01B 32/50* (2017.08); *B01J 23/72* (2013.01); *B01J 2208/00115* (2013.01); *C01B 2203/0233* (2013.01); *C01B 2203/0294* (2013.01); *C01B 2203/04* (2013.01); *C01B 2203/068* (2013.01)

(58) Field of Classification Search
CPC ........... C01B 3/05; C01B 32/50; C01B 32/40; C01B 3/48; C01B 2203/0233; C01B 2203/0294; C01B 2203/04; C01B 2203/068; B01J 23/005; B01J 23/72
See application file for complete search history.

(56) References Cited

U.S. PATENT DOCUMENTS

| | | | |
|---|---|---|---|
| 6,838,071 B1 | 1/2005 | Olsvik et al. | |
| 8,404,156 B2 | 3/2013 | Schiødt | |
| 2011/0101277 A1* | 5/2011 | Schiodt | B01J 37/03 |
| | | | 252/373 |
| 2011/0101279 A1 | 5/2011 | Schioedt | |
| 2018/0002185 A1* | 1/2018 | Pach | B01J 23/8906 |
| 2018/0354787 A1* | 12/2018 | Cousins | C01B 3/16 |

FOREIGN PATENT DOCUMENTS

| | | | | |
|---|---|---|---|---|
| EA | 201891734 A1 | 1/2019 | | |
| EP | 0361648 A1 | 4/1990 | | |
| EP | 2065337 A1 | 6/2009 | | |
| EP | 2141118 A1 | 1/2010 | | |
| EP | 2886513 A1 | 6/2015 | | |
| GB | 201522396 | 2/2016 | | |
| GB | 2536996 A | 10/2016 | | |
| JP | 2012139637 A | 7/2012 | | |
| WO | WO-9006281 A1 * | 6/1990 | ....... | C01B 2203/068 |
| WO | 0046150 A1 | 8/2000 | | |
| WO | 2010037598 A1 | 4/2010 | | |
| WO | 2012004032 A1 | 1/2012 | | |
| WO | 2013095130 A1 | 6/2013 | | |
| WO | 2014180763 A1 | 11/2014 | | |
| WO | 2015067436 A1 | 5/2015 | | |
| WO | 2016124886 A1 | 8/2016 | | |
| WO | 2016132092 A1 | 8/2016 | | |
| WO | 2017134162 A1 | 8/2017 | | |

OTHER PUBLICATIONS

Danish Search Report dated Jan. 8, 2018.
(Continued)

*Primary Examiner* — Jafar F Parsa
(74) *Attorney, Agent, or Firm* — Buchanan Ingersoll & Rooney P.C.

(57) ABSTRACT

In a process for the production of ammonia synthesis gas from a hydrocarbon-containing feedstock, comprising steam reforming of the feedstock and treatment of the synthesis gas obtained, the shift of the synthesis gas comprises two shift steps, both including stable catalysts, whereby the formation of hazardous by-products is avoided or at least reduced to an acceptable low level. The two shift steps can both be HTS, or they can be one HTS and one LTS or one HTS and one MTS. The catalyst used in the HTS and the LTS steps is based on zinc oxide and zinc aluminum spinel, and the catalyst used in the MTS and the LTS steps can be based on copper.

12 Claims, No Drawings

(56) References Cited

OTHER PUBLICATIONS

International Search Report (PCT/ISA/210) dated Sep. 4, 2018, by the European Patent Office as the International Searching Authority for International Application No. PCT/EP2018/067389.
Written Opinion (PCT/ISA/237) dated Sep. 4, 2018, by the Patent Office as the International Searching Authority for International Application No. PCT/EP2018/067389.
Office Action dated Sep. 17, 2020, by the Eurasian Patent Organizations (EAPO) in corresponding Eurasian Patent Application No. 202090244/31, and an English Translation of the Office Action. (5 pages).
Office Action (Examination Report) dated Jul. 30, 2021, by the Intellectual Property India—Government of India in corresponding Indian Patent Application No. 201917052606, with an English Translation. (6 pages).

* cited by examiner

METHOD AND CATALYSTS FOR THE PRODUCTION OF AMMONIA SYNTHESIS GAS

The present invention relates to a method for the production of ammonia synthesis gas and catalysts for use in the method.

A typical ammonia-producing plant first converts a desulfurized hydrocarbon gas, such as natural gas (i.e. methane) or LPG (liquefied petroleum gases such as propane and butane) or petroleum naphtha into gaseous hydrogen by steam reforming. The hydrogen is then combined with nitrogen to produce ammonia via the Haber-Bosch process $$3H_2 + N_2 \rightarrow 2NH_3$$

Thus, the synthesis of ammonia ($NH_3$) requires a synthesis gas (syngas) comprising hydrogen ($H_2$) and nitrogen ($N_2$) in a suitable molar ratio of about 3:1.

Conventional reforming such as steam methane reforming (SMR) involves a primary reformer and a secondary reformer. Processes for the production of ammonia synthesis gas via SMR are disclosed e.g. in EP 2 065 337 A1 and EP 2 886 513 A2.

It is well-known in the art that the production of ammonia synthesis gas is mainly performed through a combined reforming process in which desulfurized hydrocarbons are mixed with steam in a suitable ratio, and the resulting mixture is fed to a primary reformer, where most of the hydrocarbons in the feed are steam reformed (converted) into a mixture of CO, $CO_2$ and $H_2$ by exposure to a suitable catalyst at moderate pressures, generally in the range from 15 to 40 bar, and high temperatures in the range of 780 to 820° C.

The gas product exiting the primary reformer is fed to a secondary reformer, usually containing a suitable catalyst in a catalytic bed and a reaction space overlying the bed, where the gas product from the primary reformer is treated so as to provide a gas composition suitable for ammonia synthesis, i.e. having a hydrogen/nitrogen ratio close to 3:1.

The gas leaving the secondary reformer needs purification to remove carbon oxides and residual methane. According to the prior art, said purification includes shift of carbon monoxide (conversion of CO to $CO_2$), which is usually carried out in a high temperature shift (HTS) converter over an iron-based catalyst, and then in low temperature shift (LTS) converter over a copper-based catalyst. The HTS converter operates at around 320-500° C. and the LTS converter operates at around 190-250° C. After the shift, the syngas is treated by carbon dioxide removal and optionally by methanation.

Typical catalysts for use in these shift converters are based on iron and copper, respectively, and by-products are produced in trace amounts, which however are high enough to both create potential environmental problems and cause a degradation of solution in the downstream $CO_2$ removal unit. The problem increases with decreasing steam/carbon ratios. At very low steam/carbon ratios, some catalysts, such as iron based catalysts, tend to deteriorate. Others, like copper based catalysts, tend to strengthen at lower steam/carbon ratios.

In the method of the present invention, a steam/carbon ratio of less than 2.6 gives several advantages. For example, reducing the steam/carbon ratio on a general basis leads to a reduced mass flow (feed+steam) through the reforming section and the downstream cooling and synthesis gas preparation sections.

A steam/carbon ratio below 2.6 may, however, also have differences. Thus, it is well known that a shift reaction cannot be performed without formation of by-products, of which methanol and to some extent methyl formate and higher alcohols are the main ones. In an ammonia process of the known art, these by-products will be partly condensed out when water is condensed out from the synthesis gas prior to a $CO_2$ removal step. The part of the methanol, which is not condensed out, will be absorbed together with the $CO_2$ in the $CO_2$ absorber and end up in the $CO_2$ product. The typical methanol content in the $CO_2$ product is 500-1000 ppm. The by-products, including methanol, entering the $CO_2$ removal step of the known processes thus contaminates the $CO_2$ product, which gives problems if the $CO_2$ is to be used in a downstream process unit or if the $CO_2$ is released to the atmosphere, because by-products count as VOCs. A further problem of the known techniques is that methyl formate is detrimental to important components in the $CO_2$ absorption liquids used in various $CO_2$ removal steps, resulting in less capacity and high replacement costs.

U.S. Pat. No. 8,404,156 B2 discloses a process for enriching a synthesis gas in hydrogen by conversion of CO and steam over a catalyst containing oxides of Zn and Al together with one or more promotors in a high temperature shift reactor. In the process, the synthesis gas is converted further by means of the reaction $CO + H_2O \rightarrow CO_2 + H_2$ (water gas shift reaction) carried out in a first (HTS) converter followed by a second (LTS) converter, both comprising a suitable catalyst.

WO 2010/037598 A1 relates to a process for producing ammonia synthesis gas, where only one (medium temperature shift (MTS)) converter, comprising a copper-based catalyst, is used, and where the $CO_2$ is subsequently removed from the syngas by physical absorption.

In WO 2012/004032 A1, a similar process for producing ammonia synthesis gas is described, in which the syngas produced in the secondary reformer is subjected to MTS at a temperature of 200-350° C. in the presence of a Cu—Zn catalyst, and the primary reforming is done with a steam/carbon ratio below 2.

WO 2016/124886 A1, GB 2536996 A and WO 20167132092 A1 all describe processes for the production of ammonia synthesis gas from a hydrocarbon-containing feedstock, comprising steam reforming of the feedstock followed by treatment of the synthesis gas obtained. The catalysts employed for the process can i.a. be a zinc oxide/alumina catalyst for HTS and a catalyst comprising copper, zinc oxide and alumina for LTS and MTS.

Still another process for producing ammonia synthesis gas is described in WO 2014/180763 A1. The process comprises the steps of steam reforming the feed to obtain a synthesis gas comprising $H_2$, CO and $CO_2$ and treating the synthesis gas by shift of CO and subsequent removal of $CO_2$, where the shift of the synthesis gas includes HTS with an iron-based catalyst and a temperature above 300° C., and the global steam/carbon ratio of the front end is down to 2.6.

It has now turned out that the environmental problems and degradation of solution mentioned above can be overcome by replacing both the HTS and the LTS converter catalysts with catalysts based on zinc and aluminum.

By using such catalysts, the formation of by-products will be virtually eliminated, although traces of methanol may still be present. However, such traces are easily removed. Given that the catalysts are also stable, the choice of steam/carbon ratios using such catalysts is in practice not limited by anything but the process requirements.

In the method of the invention, both the primary reformer and the secondary reformer in the ammonia plant can be an autothermal reformer (ATR), which is a refractory-lined pressure vessel. When the ammonia process is ATR-based, low or very low steam/carbon ratios can be used. Therefore, the formation of by-products and also the catalyst stability are issues when the typical HTS and LTS catalysts based on iron and copper are used.

Even using a catalyst based on zinc and aluminum as HTS catalyst together with a catalyst based on copper as LTS catalyst is not enough to solve the problem, because by-products are formed during the low temperature shift. To eliminate the low temperature shift could be an option, but this is generally not interesting, e.g. due to the poor conversion of CO.

So the solution is to use catalysts that:
are stable, and
do not catalyze the formation of troublesome by-products or at least
reduce the amount of by-products produced to a low level.

The most critical by-products are:
methanol, which should be reduced at least to a level below 2000 ppm,
acetic acid, which should be reduced at least to a level below 1000 ppm, and
methyl formate, which should be reduced at least to a level below 50 ppm.

More specifically, the invention relates to a process for the production of ammonia synthesis gas from a hydrocarbon-containing feedstock, comprising the steps of:
steam reforming of the feedstock, thereby obtaining a synthesis gas comprising hydrogen ($H_2$), carbon monoxide (CO) and carbon dioxide ($CO_2$), and
treatment of the synthesis gas obtained, including shift of CO and subsequent removal of $CO_2$,
wherein
the shift of the synthesis gas comprises two shift steps, and
in both shift steps, stable catalysts based on zinc oxide and zinc aluminum spinel are used,
whereby the formation of hazardous by-products is avoided or at least reduced to an acceptable low level.

In the process of the invention, any hazardous by-products can be removed in a downstream process, preferably by using a water wash, where the water is of ambient temperature or chilled as required.

The two shift steps can both be high temperature shift (HTS) steps. Another possibility is a step of high temperature shift (HTS) and a step of low temperature shift (LTS). Further it is possible to have a step of high temperature shift (HTS) and a step of medium temperature shift (MTS).

One embodiment of the process according to the invention is to use Applicant's new HTS catalyst in both shift reactors, the secondary reactor often, but not always, operating at a lower temperature than the primary one. In fact, the new HTS catalyst can be used in both the HTS step and the LTS step. Each reactor can contain one or more catalyst beds with or without inter-bed heat exchange. The two reactors may even be combined to a single reactor provided with suitable inter-bed cooling. For the medium temperature shift (MTS), the catalyst used is preferably a copper-based catalyst in which the carrier is zinc oxide. This catalyst is characterized by a low pressure drop.

In another embodiment, reactors with isothermally operated catalyst beds are used. Possibly only one bed is needed in this embodiment.

Applicant's above-mentioned new HTS catalyst has the unique ability to operate at any steam/carbon ratio, making it possible to obtain optimal plant efficiency in ammonia production. The catalyst formulation is based on zinc and alumina, more specifically zinc oxide and zinc aluminum spinel that has become known for catalyzing the water gas shift (WGS) reaction. It has now surprisingly turned out that this HTS catalyst is also useful in MTS and LTS reactors. Since the formulation is iron-free, the formation of unwanted iron carbides that reduce the catalyst strength of conventional iron-based HTS catalysts is prevented.

Another major advantage of this HTS catalyst formulation is the complete absence of chromium, most notably the hazardous hexavalent chromium formed in all iron-based HTS catalysts. This eliminates a serious risk to plant personnel safety and also to the environment.

The invention claimed is:

1. A process for the production of ammonia synthesis gas from a hydrocarbon-containing feedstock, comprising the steps of:
steam reforming of the feedstock, thereby obtaining a synthesis gas comprising hydrogen ($H_2$), carbon monoxide (CO) and carbon dioxide ($CO_2$), and
treatment of the synthesis gas obtained, including shift of CO and subsequent removal of $CO_2$,
wherein
a primary reactor and a secondary reactor are used, at least one of said reactors being an autothermal reformer and steam/carbon ratio being less than 2.6,
the shift of the synthesis gas comprises two shift steps, wherein at least one of said shift steps is an HTS step, and
in both shift steps, stable catalysts based on zinc oxide and zinc aluminum spinel are used,
whereby the formation of hazardous by-products is avoided or at least reduced to an acceptable low level.

2. The process according to claim 1, wherein the two shift steps both are high temperature shift (HTS) steps.

3. The process according to claim 1, wherein the two shift steps are a step of high temperature shift (HTS) and a step of low temperature shift (LTS).

4. The process according to claim 1, wherein the two shift steps are a step of high temperature shift (HTS) and a step of medium temperature shift (MTS).

5. The process according to claim 3, wherein the catalyst used in the low temperature shift (LTS) step is based on copper.

6. The process according to claim 5, wherein the carrier for the copper-based catalyst is zinc oxide.

7. The process according to claim 1, wherein the two shift steps are combined to a single reactor provided with suitable inter-bed cooling.

8. The process according to claim 1, wherein the two shift steps are combined to a single isothermal reactor.

9. The process according to claim 1, wherein any hazardous by-products are removed in a downstream process.

10. The process according to claim 4, wherein the catalyst used in the medium temperature shift (MTS) step is based on copper.

11. The process according to claim 10, wherein the carrier for the copper-based catalyst is zinc oxide.

12. The process according to claim 1, wherein methanol is at a level below 2000 ppm, acetic acid is at a level below 1000 ppm, and methyl formate is at a level below 50 ppm.

\* \* \* \* \*